United States Patent
Lee et al.

(10) Patent No.: US 7,335,001 B2
(45) Date of Patent: Feb. 26, 2008

(54) APPARATUS AND METHOD FOR CONTROLLING OPERATION OF A RECIPROCATING COMPRESSOR

(75) Inventors: Chel-Woong Lee, Seoul (KR); Ji-Won Sung, Seoul (KR); Jae-Yoo Yoo, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 625 days.

(21) Appl. No.: 10/751,506

(22) Filed: Jan. 6, 2004

(65) Prior Publication Data
US 2004/0239266 A1 Dec. 2, 2004

(30) Foreign Application Priority Data
May 26, 2003 (KR) ............ 10-2003-0033484

(51) Int. Cl.
*F04B 49/06* (2006.01)
(52) U.S. Cl. ............ 417/44.11; 417/44.8; 417/44.1; 417/53
(58) Field of Classification Search ............ 417/44.11, 417/44.1, 44.8, 53, 212, 415
See application file for complete search history.

(56) References Cited

U.S. PATENT DOCUMENTS 6,527,519 B2* 3/2003 Hwang et al. ............ 417/44.11
6,685,438 B2* 2/2004 Yoo et al. ............ 417/44.11
6,851,934 B2* 2/2005 Yoo et al. ............ 417/44.11

FOREIGN PATENT DOCUMENTS

CN 1400388 A 3/2003
CN 1400389 A 3/2003

* cited by examiner

*Primary Examiner*—Anthony D. Stashick
*Assistant Examiner*—Peter J Bertheaud
(74) *Attorney, Agent, or Firm*—Birch, Stewart, Kolasch & Birch, LLP

(57) ABSTRACT

An apparatus and a method for controlling an operation of a reciprocating compressor can improve efficiency of a compressor by reconciling an operation frequency with a mechanical resonant frequency. The apparatus includes a mechanical resonant frequency calculating unit for calculating mechanical resonant frequency, using a current applied to a compressor and a stroke; an operation frequency reference value determining unit for determining an operation frequency reference value within a predetermined range of the calculated mechanical resonant frequency; and a controller for comparing the determined operation frequency and a current operation frequency, and then variably controlling an operation frequency of the compressor according to the comparison result, so that stroke feedback or TDC feedback can be controlled more accurately. Accordingly, an operational efficiency of the compressor is improved.

18 Claims, 5 Drawing Sheets

APPARATUS AND METHOD FOR CONTROLLING OPERATION OF A RECIPROCATING COMPRESSOR

This Nonprovisional application claims priority under 35 U.S.C. § 119(a) on Patent Application No. 10-2003-0033484 filed in KOREA on May 26, 2003, the entire contents of which are hereby incorporated by reference.

BACKGROUND OF THE INVENTION

1. Field of the Invention

The present invention relates to a reciprocating compressor, and particularly to an apparatus and a method for controlling an operation of a reciprocating compressor capable of improving operational efficiency of a compressor by calculating a mechanical resonant frequency corresponding to a load state, and variably controlling a frequency according to the calculated resonant frequency.

2. Description of the Background Art

In these days, compressors of various types are being used, and most generally used compressor among those is a reciprocating compressor for sucking, compressing, and discharging refrigerant gas while a piston linearly reciprocates in a cylinder.

The reciprocating compressor can be divided into a recipro type and a linear type according to a type of driving a piston.

In the recipro type compressor, a rotation movement of a motor is converted into a linear movement to compress refrigerant gas, and so in order to convert a rotation movement into a linear movement, there is a need for a converting apparatus such as a screw, a chain, a gear system, a timing belt or the like. Accordingly, energy loss generated due to the conversion is great, and a structure of an apparatus is complicated. For this reason, a reciprocating compressor of the linear type where the motor itself linearly reciprocates, is generally used in these days.

In a linear type reciprocating compressor, since the motor itself generates a linear driving force, there is no need for a mechanical converting apparatus, a structure thereof is not complicated, loss caused by conversion of energy can be reduced, and noise can be remarkably reduced since there is no coupling portion where friction and an abrasion are generated, In case of using the reciprocating compressor of the linear type for a refrigerator and an air conditioner, since as varying a stroke voltage applied to the compressor, a compression ratio is varied, freezing capacity can be variably controlled.

FIG. 1 is a block diagram showing a structure of an apparatus for controlling an operation of a conventional reciprocating compressor.

As shown therein, the apparatus for controlling the operation of the conventional reciprocating compressor includes a reciprocating compressor 3 varying a stroke (which means a distance between a top dead center of a piston and a bottom dead center thereof) by reciprocation of a piston by a stroke voltage, and thus controlling freezing capacity (or refrigerating capacity); a voltage detecting unit 5 for detecting a voltage generated from the reciprocating compressor 3; a current detecting unit 6 for detecting a current generated from the reciprocating compressor 3; a stroke calculating unit 4 for estimating a stroke by the detected current and voltage and a motor parameter; a comparator 1 for comparing the estimated stroke value and a stroke reference value, and then outputting a difference signal according to the comparison result; and a controller 2, according to the difference signal, varying a voltage applied to the motor, and thus controlling the stroke.

Control operations of the conventional reciprocating compressor constructed as above, will now be described.

In the reciprocating compressor 3, when the compressor 3 receives a predetermined stroke reference value from a user, and then outputs a stroke value, a stroke is varied by a vertical movement of a piston in a cylinder, and a cooling gas in the cylinder is transmitted to a condenser through a discharging valve thereby controlling freezing capacity.

Herein, as the stroke is varied by the stroke voltage, a voltage detecting unit and a current detecting unit detect a voltage and a current generated from the reciprocating compressor, and output the detected voltage and current values to the stroke calculating unit 4 respectively. Accordingly, the stroke calculating unit 4 calculates a velocity of the piston (equation 1), and a stroke (equation 2), by applying the current and the voltage and a motor parameter to equation below, and thereafter, outputs the estimated stroke value to the comparator 1.

$$\text{Velocity} = \frac{1}{\alpha}\left(V_M - Ri - L\frac{di}{dt}\right) \quad (1)$$

$$\text{Stroke} = \frac{1}{\alpha}\int (\text{Velocity})dt \quad (2)$$

Herein, α means a motor constant for calculating a stroke and for converting electrical power into mechanical power, R a loss value caused by resistance such as copper loss and iron loss, L inductance, and $V_M$ a voltage between both ends of a motor.

Thereafter, the comparator 1 compares the estimated stroke value and the stroke reference value and applies a difference signal to the controller 2 according to the comparison result. Accordingly, the controller 2 varies a voltage applied to the motor of the compressor 3 and thus controls a stroke.

FIG. 2 is an operation flow chart of a method for controlling an operation according to an estimated stroke value of the conventional reciprocating compressor.

As shown therein, the stroke calculating unit 4 receives a voltage and a current applied to the reciprocating compressor, and estimates a current stroke (SP1).

Thereafter, if the estimated current stroke value is greater than the stroke reference value, the controller 2 decreases a voltage applied to a motor (SP2, SP4), or if the estimated current stroke value is smaller than the stroke reference value, the controller 2 increases a voltage applied to a motor (SP2, SP3).

However, in the apparatus and the method for controlling the operation of the conventional reciprocating compressor, even though a mechanical resonant frequency is varied as a load (a temperature of outer air of a refrigerator or a temperature of a condenser) is varied, a stroke is controlled by a constant frequency without varying an operation frequency, therefore operational efficiency of the compressor is deteriorated.

SUMMARY OF THE INVENTION

Therefore, an object of the present invention is to provide an apparatus and a method for controlling an operation of a reciprocating compressor capable of improving operational efficiency of a compressor by determining an average value of one period of a value obtained by multiplying a stroke and a current, as a mechanical resonant frequency, and determining an operation frequency of which the average value is close to zero, as an operation frequency in order to reconcile an operation frequency with a mechanical resonant frequency whenever a load is varied.

To achieve these and other advantages and in accordance with the purpose of the present invention, as embodied and broadly described herein, there is provided an apparatus for controlling an operation of a reciprocating compressor including a mechanical resonant frequency calculating unit for calculating a mechanical resonant frequency, using a current applied to a compressor and a stroke; an operation frequency reference value determining unit for determining an operation frequency reference value within a predetermined range of the calculated mechanical resonant frequency; and a controller for comparing the determined operation frequency reference value and a current operation frequency, and then variably controlling an operation frequency of the compressor according to the comparison result.

To achieve these and other advantages and in accordance with the purpose of the present invention, as embodied and broadly described herein, there is provided a method for controlling an operation of a reciprocating compressor including the steps of detecting a current applied to the compressor and a stroke at a certain period; calculating a mechanical resonant frequency, using the detected current and a stroke; and determining an operation frequency reference value by decreasing/increasing a current operation frequency so as to be within a predetermined range of the mechanical resonant frequency, and then driving the compressor with the operation frequency reference value.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
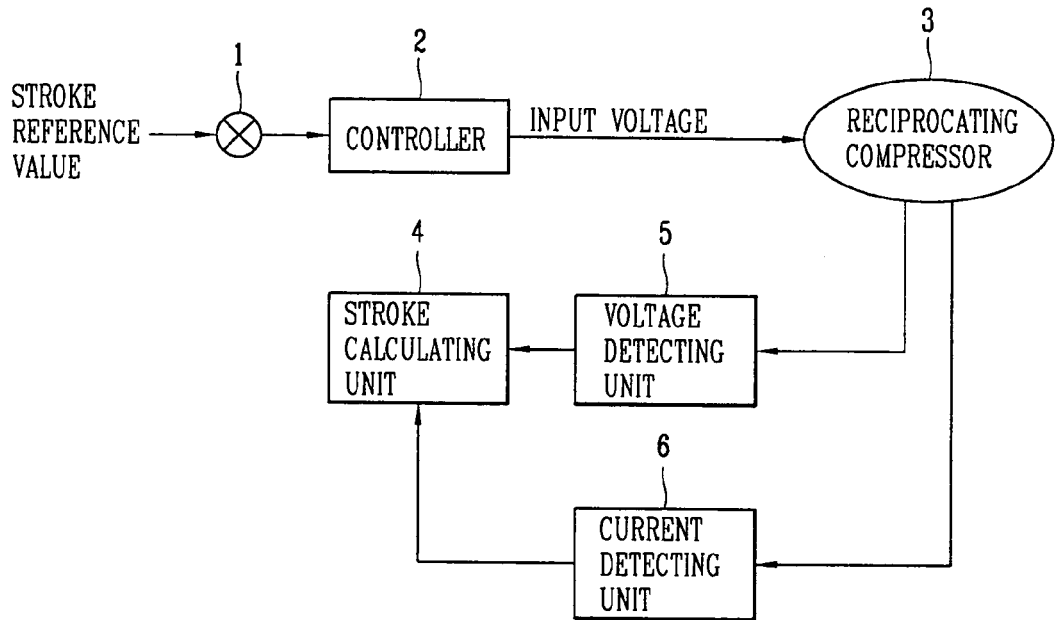
FIG. 1 is a block diagram illustrating a structure of an apparatus for controlling an operation of the conventional reciprocating compressor.
Figure 2:
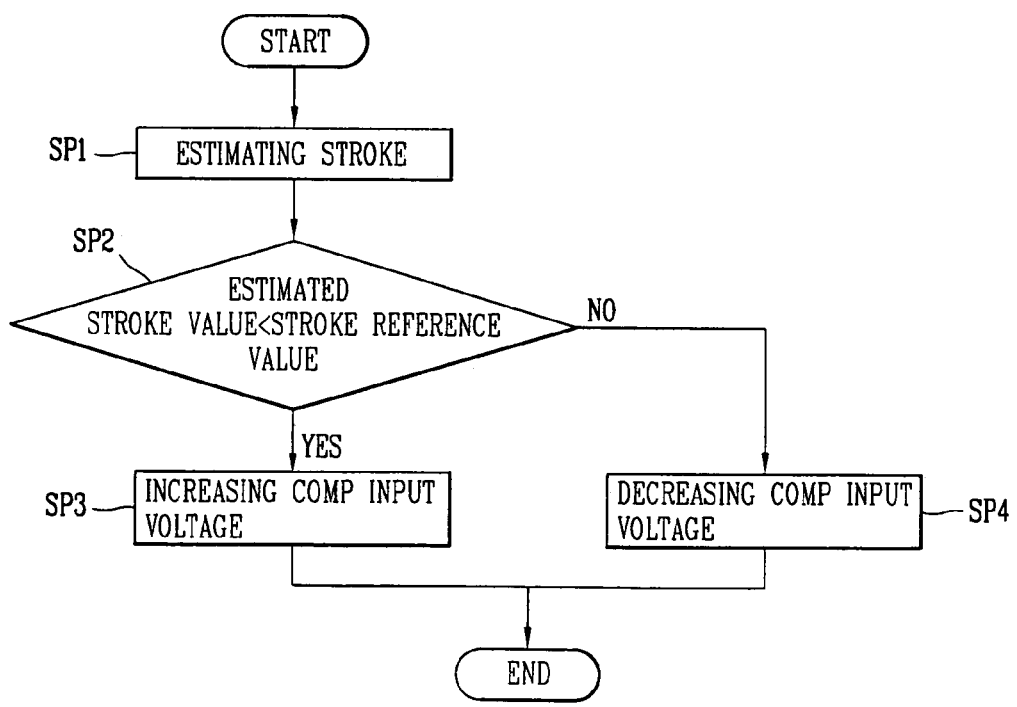
FIG. 2 is an operation flow chart illustrating a method for controlling an operation according to an estimated stroke value of the conventional reciprocating compressor.
Figure 3:
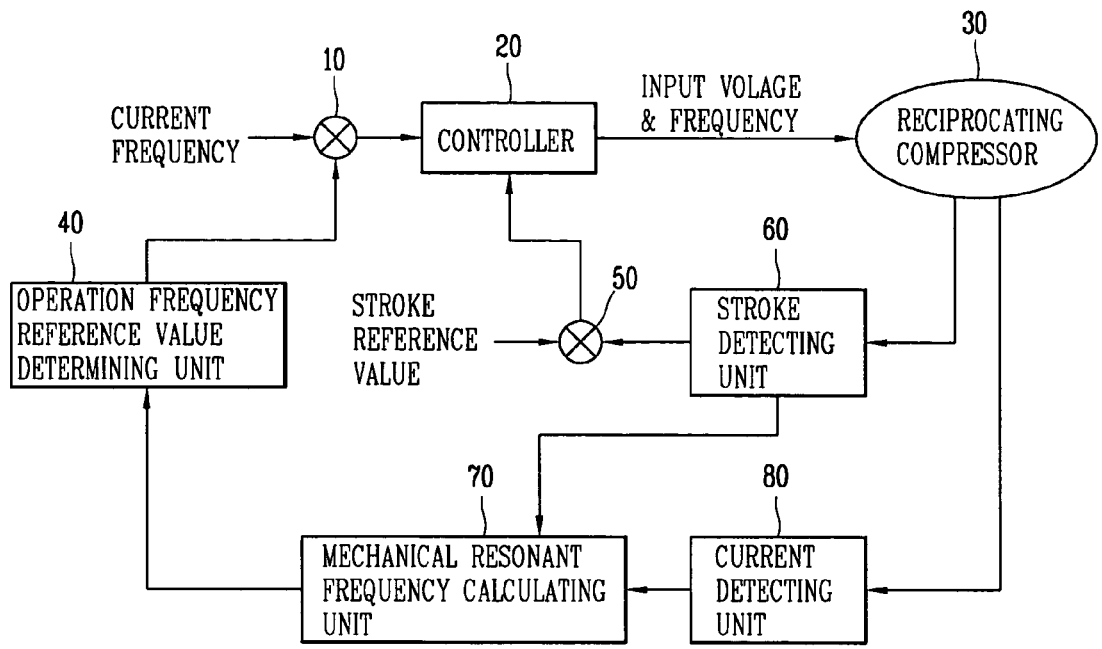
FIG. 3 is a block diagram illustrating a structure of an apparatus for controlling an operation of a reciprocating compressor according to the present invention.

FIG. 3 is a block diagram illustrating a structure of an apparatus for controlling an operation of a reciprocating compressor according to the present invention.

As shown therein, an apparatus for controlling an operation of a reciprocating compressor according to the present invention includes a current detecting unit 80 for detecting a current applied to a compressor 30; a stroke detecting unit 60 for detecting a stroke generated at the compressor 30; a mechanical resonant frequency calculating unit 70 for calculating a mechanical resonant frequency (Pavg) with using a current outputted from the current detecting unit 80 and a stroke outputted from the stroke detecting unit 60; an operation frequency reference value determining unit 40 for determining an operation frequency reference value within a predetermined range (0±d) of the calculated mechanical resonant frequency; a first comparator 10 for comparing the operation frequency reference value and a current (present) operation frequency, and outputting a difference value according to the comparison result; a second comparator 50 for comparing the stroke outputted from the stroke detecting unit 60 and a stroke reference value, and outputting a difference value according to the comparison result; and a controller 20 for varying an operation frequency of the compressor according to the difference value outputted from the first comparator 10, varying a voltage applied to the compressor according to the difference value outputted from the second comparator 50, and thus controlling a stroke.

Figure 4:
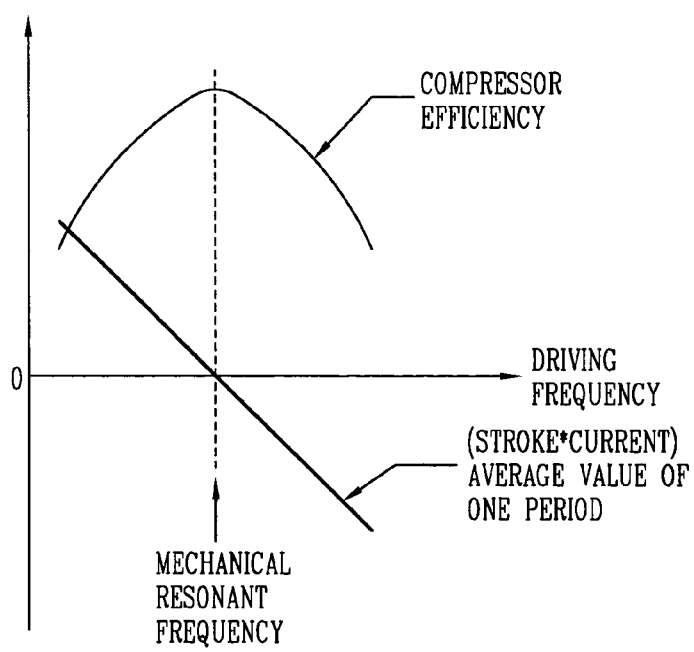
FIG. 4 is a graph illustrating a relation between an operation frequency varying constant and efficiency of a compressor in FIG. 3.
Figure 5:
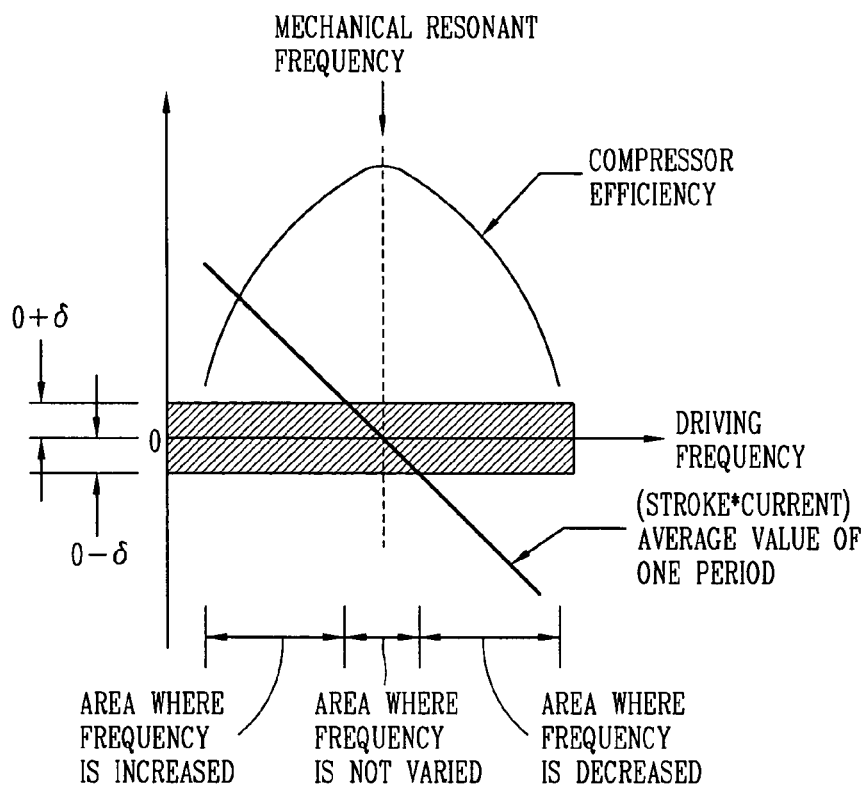
FIG. 5 is a graph illustrating an increase/decrease of an operation frequency according to a size of an operation frequency varying constant in FIG. 3.

FIG. 4 is a graph illustrating a relation between a mechanical resonant frequency and efficiency of a compressor in FIG. 3. FIG. 5 is a graph showing an increase/decrease of an operation frequency according to a size of a mechanical resonant frequency in FIG. 3.

Operations according to a structure of an apparatus for controlling an operation of the reciprocating compressor will now be described with reference to FIGS. 4 and 5.

First, the current detecting unit 80 detects a current applied to the compressor 30, and the stroke detecting unit 60 detects a stroke generated at the compressor 30. Herein, the compressor 30 means a reciprocating compressor, and preferably means a linear type reciprocating compressor. Also, the stroke is determined by calculating with a sensorless method (i.e., determined using voltage and current).

Thereafter, a mechanical resonant frequency (Pavg) is calculated, using the current outputted from the current detecting unit 80 and the stroke outputted from the stroke detecting unit 60. The mechanical resonant frequency (Pavg) is obtained by multiplying the current and the stroke, and then averaging the obtained value for one period (elapsed time when the piston reciprocates between the top point and the bottom point of the compressor). As shown in FIG. 4, when the mechanical resonant frequency is close to zero, the compressor obtains maximum operation efficiency.

According to this, as shown in FIG. 5, the operation frequency reference value determining unit 40 determines an operation frequency reference value so that the compressor can be operated with an operation frequency close to the mechanical resonant frequency outputted from the mechanical resonant frequency calculating unit 70, and outputs the operation frequency reference value.

Thereafter, the first comparator 10 compares the operation frequency reference value and a current operation frequency, and outputs a difference value according to a comparison result. Accordingly, the controller 20 varies an operation frequency applied to a compressor, corresponding to the difference value outputted from the first comparator 10.

The second comparator 50 compares a stroke reference value and a stroke outputted from the stroke detecting unit 60, and outputs a difference value corresponding to a comparison result. According to this, the controller 20 controls a stroke by varying a voltage applied to the compressor, corresponding to the outputted value of the second comparator 50.

Figure 6:
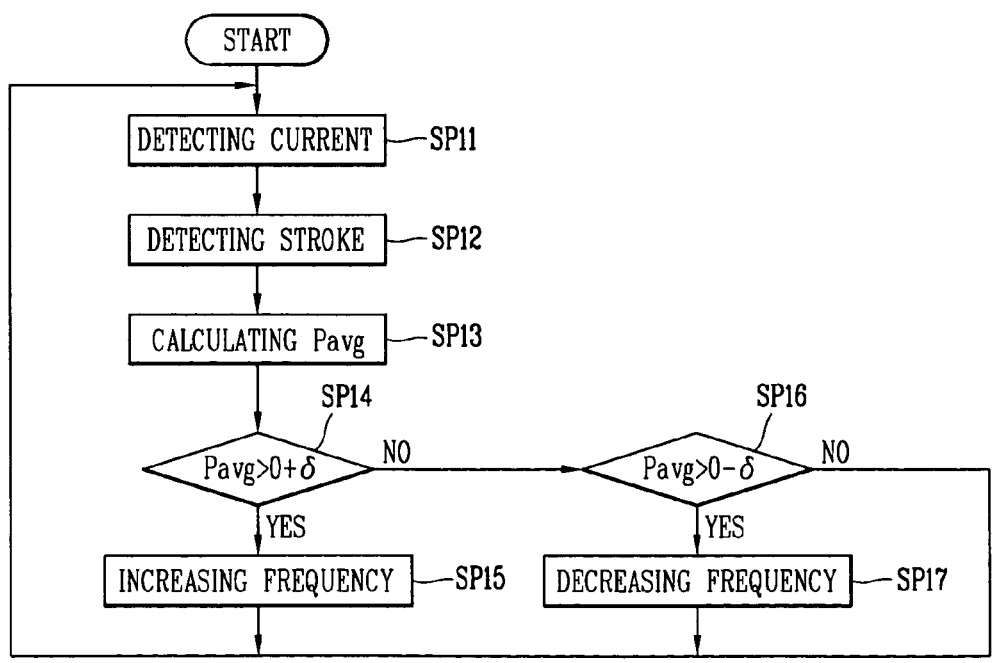
FIG. 6 is an operation flow chart illustrating a method for controlling an operation of a reciprocating compressor according to the present invention.

FIG. 6 is an operation flow chart illustrating a method for controlling an operation of a reciprocating compressor according to the present invention.

As shown therein, in a method for controlling an operation of a reciprocating compressor according to the present invention, a current and a stroke applied to the compressor are detected at a certain period (SP11, SP12).

Thereafter, using the detected current and stroke, a mechanical resonant frequency ($P_{avg}$) is calculated (SP13). At this time, the mechanical resonant frequency is implemented by equation 3 below.

$$P_{avg} = \frac{X_p I_p}{2} \cos \theta_1 \qquad (3)$$

Herein, $X_p$ means a stroke peak value, $I_p$ a current peak value, and $\theta_1$ a phase difference between a stroke and a current.

Examining the equation 3, in case that a stroke and a current includes only a fundamental component, when a phase difference between the stroke and the current is 90 degrees, an average value of one period of a value obtained by multiplying a stroke and a current is always zero. At this time, even though a DC offset and a harmonic component are included at the stroke and the current, the values thereof can be ignored since they are not great.

Thereafter, the operation frequency reference value determining unit 40 determines an operation frequency reference value by decreasing/increasing a current operation frequency so as to be within a predetermine range of the mechanical resonant frequency. Then, the first comparator 10 compares the operation frequency reference value and a current operation frequency, and outputs a difference value according to the comparison result. The controller 20 varies an operation frequency of the compressor according to the difference value outputted from the first comparator 10 (SP14~SP17).

As shown in FIG. 5, the predetermine range of the mechanical resonant frequency means upper/lowest limit values in an area where a frequency is not varied. Accordingly, if a current operation frequency is within the predetermine range (0±δ) of the mechanical resonant frequency ($P_{avg}$), the current operation frequency is determined as an operation frequency reference value without varying a frequency. If a current operation frequency is greater than the predetermine range (0±δ) of the mechanical resonant frequency, the current operation frequency is increased as much as a predetermined level, and the increased operation frequency is determined as an operation frequency reference value. If a current operation frequency is smaller than the predetermine range (0–δ) of the mechanical resonant frequency, the current operation frequency is decreased as much as a predetermined level, and the decreased current operation frequency is determined as an operation frequency reference value.

FIGS. 7a~7d are graphs showing relations between a predetermined range of a mechanical resonant frequency and a stroke/a current.

Figure 7A:
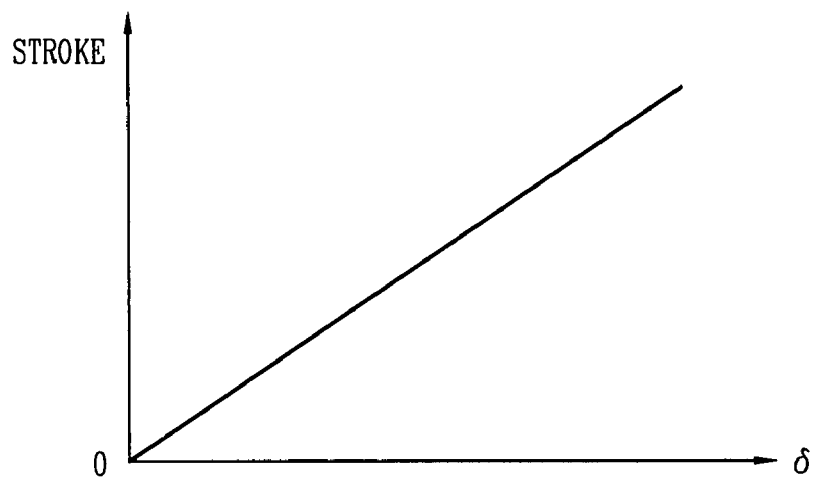
FIGS. 7a~7d are graphs illustrating a relation between a predetermined range of a mechanical resonant frequency and a current, and the range and a current.
Figure 7B:
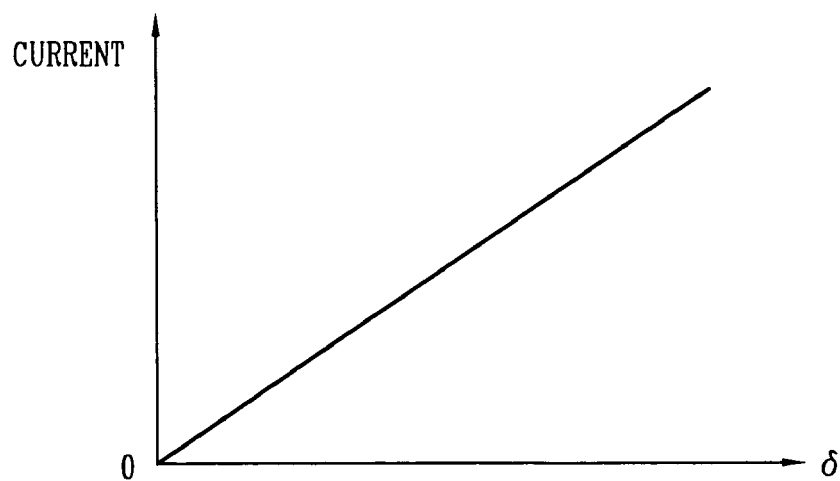
Figure 7C:
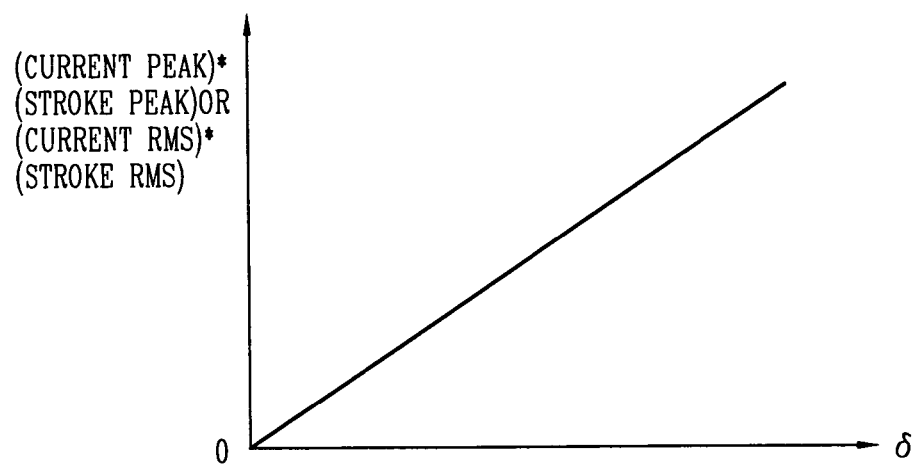
Figure 7D:
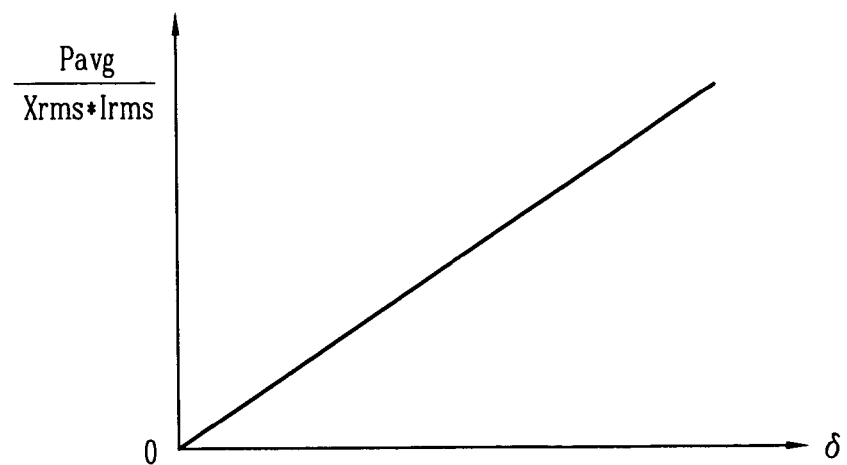

As shown in FIGS. 7a and 7b, the predetermined range (0±δ) of the mechanical resonant frequency is set to be proportional to a size of a stroke or a size of a current, or as shown in FIG. 7c, to a size of a value obtained by multiplying a stroke peak value and a current peak value or a size of a value obtained by multiplying a stroke effective value ($X_{rms}$) and a current effective value ($I_{rms}$), or, as shown in FIG. 7d, to a size of a value obtained by dividing an average value ($P_{avg}$) of one period of a value obtained by multiplying a stroke and a current, by a size of a value obtained by multiplying a stroke effective value ($X_{rms}$) and a current effective value ($I_{rms}$).

As another embodiment of a reciprocating compressor using a mechanical resonant frequency according to the present invention, a TDC (top dead center) detecting unit for detecting an upper limit point of a movement of a piston in a cylinder or detecting a position at which a volume of a cylinder is minimized, is provided. So, if a compressor is controlled at a spot at which a TDC of a piston is zero, qualitative control (control using characteristics of a compressor) can be performed without relation to a change of a load.

That is, in the reciprocating compressor using a mechanical resonant frequency, a control unit compares a current TDC and a TDC reference value, and then, controls TDC feedback of the piston by applying a voltage to the compressor according to the comparison result. Accordingly, since accurate TDC control can be performed according to a variety of a load, an abrasion and a collision of a piston, which are caused by a change of a TDC, and a shortage of a freezing capacity of a compressor during its operation are prevented, and thus operational efficiency of the compressor can be improved.

As so far described, in the present invention, the average value of one period of a value obtained by multiplying a stroke and a current is determined as a mechanical resonant frequency whenever a load is varied, and an operation frequency of which the average value is close to zero is determined as an operation frequency reference value, so that stroke feedback or TDC feed back can be controlled more accurately. Accordingly, an operation efficiency of the compressor is improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An apparatus for controlling an operation of a reciprocating compressor comprising:
  a mechanical resonant frequency calculating unit for calculating a mechanical resonant frequency using a current and a stroke applied to a compressor;

an operation frequency reference value determining unit for determining an operation frequency reference value within a predetermined range of the calculated mechanical resonant frequency; and a controller for comparing the determined operation frequency and a current operation frequency, and then variably controlling an operation frequency of the compressor according to the comparison result, wherein the mechanical resonant frequency calculating unit obtains the mechanical resonant frequency by multiplying the stroke and the current corresponding to a load state of the compressor and then averaging the obtained value for one period; wherein, when the mechanical resonant frequency is close to zero, the compressor obtains maximum operating efficiency.

2. The apparatus of claim 1, further comprising:

a current detecting unit for detecting a current applied to the compressor;

a stroke detecting unit for detecting a stroke generated from the compressor; and a first comparator for comparing the operation frequency reference value and a current operation frequency, and outputting a difference value according to the comparison result.

3. The apparatus of claim 2, further comprising a second comparator for comparing a stroke outputted from the stroke detecting unit and a stroke reference value.

4. The apparatus of claim 2, wherein the controller compares a stroke outputted from the stroke detecting unit and a stroke reference value, varies a voltage applied to the compressor according to the comparison result, and thus controls a stroke.

5. The apparatus of claim 1, wherein the compressor is a linear type reciprocating compressor.

6. The apparatus of claim 1, further comprising a TDC detecting unit for detecting an upper limit point of a piston movement in a cylinder of the compressor, or a position at which a volume of the cylinder is minimized.

7. The apparatus of claim 6, wherein the controller compares a current TDC outputted from the TDC detecting unit and a TDC reference value, and, by applying a voltage to the compressor according to the comparison result, controls TDC feedback of a piston.

8. The apparatus of claim 1, wherein the operation frequency reference value determining unit determines a current operation frequency as an operation frequency reference value without varying a frequency if a size of the operation frequency is within a predetermined range of the mechanical resonant frequency.

9. The apparatus of claim 1, wherein the operation frequency reference determining unit increases a current operation frequency as much as a predetermined level if a size of the operation frequency is greater than the predetermined range of the mechanical resonant frequency, and determines the increased operation frequency as an operation frequency reference value.

10. The apparatus of claim 1, wherein the operation frequency reference value determining unit decreases a current operation frequency as much as a predetermined level if a size of the operation frequency is smaller than the predetermined range of the mechanical resonant frequency.

11. The apparatus of claim 1, wherein the predetermined range of the mechanical resonant frequency is set to be proportional to a size of a stroke, a size of a current, a size of a value obtained by multiplying a stroke peak value and a current peak value, a size of a value obtained by multiplying a stroke effective value (Xrms) and a current effective value (Irms), or a size of a value obtained by dividing an average value ($P_{avg}$) of one period of a value obtained by multiplying a stroke and a current, by a value obtained by multiplying a stroke effective value ($X_{rms}$) and a current effective value ($I_{rms}$).

12. A method for controlling an operation of a reciprocating compressor comprising:

detecting a current applied to a compressor and a stroke at certain period;

calculating a mechanical resonant frequency by multiplying the stroke and the current corresponding to a load state of the compressor and then averaging the obtained value for one period; wherein, when the mechanical resonant frequency is close to zero, the compressor obtains maximum operating efficiency;

determining an operation frequency reference value by decreasing/increasing a current operation frequency so as to be within a predetermined range of the calculated mechanical resonant frequency, and then driving a compressor with the operation frequency reference value.

13. The method of claim 12, further comprising: comparing the detected stroke and a stroke reference value, and varying a voltage applied to a compressor according to the comparison result thereby controlling a stroke feedback, or comparing a current TDC detected from the compressor and a TDC reference value, and varying a voltage applied to the compressor according to the comparison result thereby controlling a TDC feedback of a piston.

14. The method of claim 12, wherein the mechanical resonant frequency is implemented by an equation below.

$$P_{avg} = \frac{X_p I_p}{2} \cos\theta_1$$

Herein, $P_{avg}$ is a mechanical resonant frequency, $X_p$ a stroke peak value, $I_p$ a current peak value, and $\theta_1$ a phase difference of a stroke and a current.

15. The method of claim 12, wherein said driving the compressor with the operation frequency reference value comprises:

determining a current operation frequency as an operation frequency reference value without varying a frequency if a current operation frequency is within a predetermined range of the mechanical resonant frequency;

increasing a current operation frequency as much as a predetermined level if a current operation frequency is greater than a predetermined range of the mechanical resonant frequency, and then determining the increased operation frequency as an operation frequency reference value; and decreasing a current operation frequency as much as a predetermined level if a current operation frequency is smaller than a predetermined range of the mechanical resonant frequency, and then determining the decreased operation frequency as an operation frequency reference value.

16. The method of claim 12, wherein the predetermined range of the mechanical resonant frequency is set to be proportional to a size of a stroke or a size of a current.

17. The method of claim 12, wherein the predetermined range of the mechanical resonant frequency is set to be proportional to a size of a value obtained by multiplying a stroke peak value and a current peak value or a size of a value obtained by multiplying a stroke effective value (Stroke rms) and a current effective value (Current rms).

18. The method of claim 12, wherein the predetermined range of the mechanical resonant frequency is set to be proportional to a size of a value obtained by dividing an average value ($P_{avg}$) of one period of a value obtained by multiplying a stroke and a current by a value obtained by multiplying a stroke effective value ($X_{rms}$) and a current effective value ($I_{rms}$).

* * * * *